(12) United States Patent
Ishikawa (10) Patent No.: US 6,561,946 B2
(45) Date of Patent: May 13, 2003

(54) TOROIDAL-TYPE CONTINUOUSLY VARIABLE TRANSMISSION (75) Inventor: Kouji Ishikawa, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/903,487

(22) Filed: Jul. 12, 2001

(65) Prior Publication Data
US 2002/0019289 A1 Feb. 14, 2002

(30) Foreign Application Priority Data
Jul. 14, 2000 (JP) .................................... 2000-213828

(51) Int. Cl.⁷ ................................................ F16H 15/38
(52) U.S. Cl. ........................................ 476/46; 476/40
(58) Field of Search ............................. 476/40, 42, 46

(56) References Cited

U.S. PATENT DOCUMENTS

| 767,604 | A | * | 8/1904 | Sperry | 476/42 |
|---|---|---|---|---|---|
| 4,499,782 | A | * | 2/1985 | Perry | 476/10 |
| 4,955,246 | A | * | 9/1990 | Nakano | 384/604 |
| 5,536,091 | A | * | 7/1996 | Takata et al. | 384/609 |
| 5,575,736 | A | | 11/1996 | Takemura | 476/46 |
| 5,580,328 | A | | 12/1996 | Aramaki | 476/40 |
| 5,584,778 | A | * | 12/1996 | Machida et al. | 476/40 |

FOREIGN PATENT DOCUMENTS

| JP | 62-71465 | 5/1987 | .......... F16H/15/38 |
|---|---|---|---|
| JP | 1-173552 | 12/1989 | .......... F16H/15/38 |
| JP | 6-40501 | 5/1994 | .......... F16H/15/38 |
| JP | 9-4689 | 1/1997 | .......... F16H/15/38 |
| JP | 9-303509 | 11/1997 | .......... F16H/15/38 |
| JP | 2001-116098 | 4/2001 | .......... F16H/15/38 |

* cited by examiner

Primary Examiner—David Fenstermacher
Assistant Examiner—Timothy McAnulty
(74) Attorney, Agent, or Firm—Sughrue Mion, PLLC

(57) ABSTRACT

A toroidal-type continuously variable transmission includes first and second disks, a trunnion and a power roller. The first and second disks are coaxially and rotatably supported in a state that inner surfaces thereof are opposed to each other. The trunnion swings around a pivot shaft which is disposed at a torsional position with respect to a center shaft of the first and second disks. The power roller is sandwiched between the first and second disks in a state being rotatably supported at inner surface of the trunnion. The power roller has a first shaft portion which is protrusively provided at a center portion of an outer surface thereof in a coaxial manner with the power roller, and the power roller is rotatably supported by the first shaft portion.

4 Claims, 5 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission for use as a transmission unit of an automatic transmission for an automobile or a transmission for various types of industrial machines, for example.

2. Description of the Related Art

Figure 3:
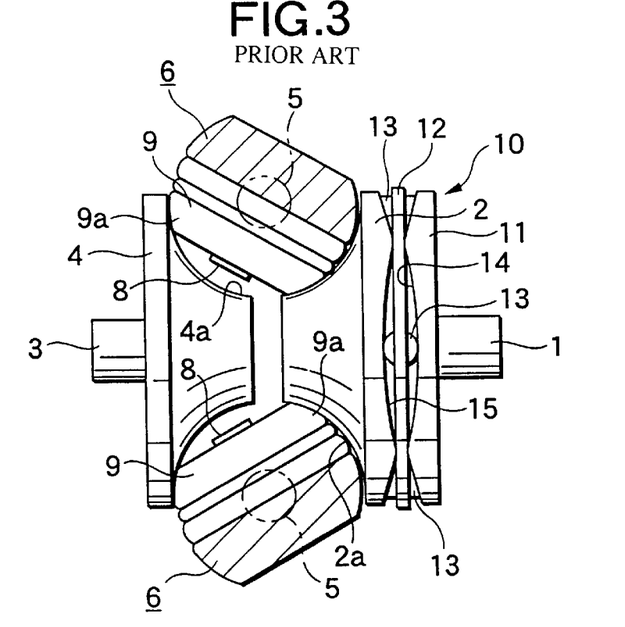
FIG. 3 is a side view showing the basic configuration of a conventionally known toroidal-type continuously variable transmission at the time of maximum deceleration.
Figure 4:
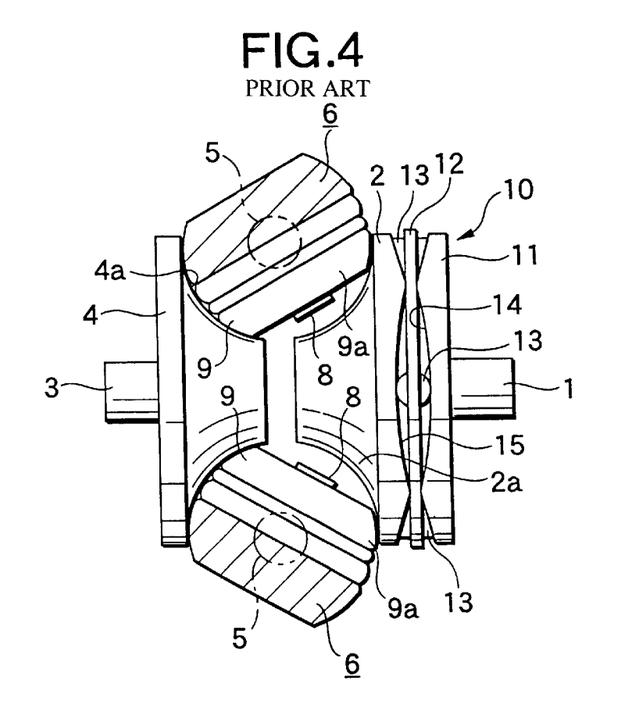
FIG. 4 is a side view showing the basic configuration of a conventionally known toroidal-type continuously variable transmission at the time of maximum acceleration.

A toroidal-type continuously variable transmission configured as shown in FIGS. 3 to 4 has been partially used as the transmissions for automobiles. As disclosed in Japanese Utility Model Laid-Open No. 7 1465/1987, for example, such a toroidal-type continuously variable transmission is configured in a manner that an input side disk 2 as a first disk is supported concentrically with an input shaft 1, and an output side disk 4 as a second disk is fixed to the end portion of an output shaft 3 disposed concentrically with the input shaft 1. At the inside of a casing in which the toroidal-type continuously variable transmission is housed, there are disposed trunnions 6, 6 swingable around pivot shafts 5, 5, which are disposed on an imaginary plane that is perpendicular to an imaginary line connecting the respective axes of the input and output shafts 1, 3, and distanced from the intersection of the imaginary plane and imaginary line, as shown in FIG. 3. This physical relation is hereinafter referred to as "torsional relation (torsional position)".

The base half portions of displacement shafts 8 are supported by circular holes 7 (see FIG. 6 described later) which are formed at the intermediate portions of the trunnions 6, 6, respectively. The inclined angles of the displacement shafts 8 supported at the intermediate portions of the trunnions 6, 6 are freely adjusted by swinging the respective trunnions 6, 6 around the pivot shafts 5, 5, respectively. In the displacement shafts 8 which base half portions are supported by the trunnions 6, 6, power rollers 9 are supported rotatably at the peripheries of the tip half portions of the displacement shafts 8 protruding from the inner surfaces of the trunnions 6, 6, respectively. These power rollers 9, 9 are sandwiched between the input side disk 2 and the output side disk 4. Incidentally, the base half portions and the tip half portions of the displacement shafts 8, 8 are eccentric to each other.

Each of opposed inner surfaces 2a, 4a of the input side disk 2 and the output side disk 4 is configured in its section as a concave surface formed by rotating an arc around the pivot shaft 5 or a curved line similar to such an arc. The peripheral surfaces 9a, 9a of the power rollers 9, 9 each formed as a spherically convex surface abut against the inner surfaces 2a, 4a, respectively.

A pressure device 10 of a loading cam type is provided between the input shaft 1 and the input side disk 2. Thus, the input side disk 2 is elastically pushed toward the output side disk 4 by the pressure device 10. The pressure device 10 is configured by a cam plate 11 rotating together with the input shaft 1 and a plurality of (for example, four) rollers 13, 13 held by a retainer 12. A cam surface 14 forming a curved surface extending in the circumferential direction is formed on the one side surface (left side surface in FIGS. 3 and 4) of the cam plate 11, and a cam surface 15 having the similar configuration as the cam surface 14 is also formed on the outer surface (right side surface in FIGS. 3 and 4) of the input side disk 2. The plurality of rollers 13, 13 are rotatably supported around the shafts extending radially with respect to the center of the input shaft 1.

When the above-structured toroidal-type continuously variable transmission is in operation, in case where the cam plate 11 rotates in accordance with the rotation of the input shaft 1, the plurality of the rollers 13, 13 are pressed by the cam surface 14 to the cam surface 15 provided at the outer surface of the input side disk 2. As a result, the input side disk 2 is pressed against the plurality of the power rollers 9, 9 and, at the same time, the pair of the cam surfaces 14, 15 and the rolling surfaces of the plurality of the rollers 13, 13 are pushed to each other, whereby the input side disk 2 is rotated. The rotation of the input side disk 2 is transmitted to the output side disk 4 through the power rollers 9, 9 to thereby rotate the output shaft 3 fixed to the output side disk 4.

Of case where the rotation speeds of the input shaft 1 and the output shaft 3 are changed, at first, in the case of performing deceleration between the input shaft 1 and the output shaft 3, the trunnions 6, 6 are swung around the pivot shafts 5, 5. Thus, the displacement shafts 8, 8 are inclined in such a manner that the peripheral surfaces 9a, 9a of the power rollers 9, 9 are respectively abutted against the near-center portions of the inner surfaces 2a of the input side disk 2 and the near-outer-periphery portions of the inner surfaces 4a of the output side disk 4, as shown in FIG. 3, respectively.

In contrast, in the case of performing the acceleration, the trunnions 6, 6 are swung. And, the displacement shaft 8, 8 are inclined in such a manner that the peripheral surfaces 9a, 9a of the power rollers 9, 9 abut against the near-outer-periphery portions of the inner surfaces 2a of the input side disk 2 and the near-center portions of the inner surfaces 4a of the output side disk 4, as shown in FIG. 4, respectively. When the inclined angles of the displacement shafts 8, 8 are set to intermediate values between FIGS. 3 and 4, an intermediate transmission gear ratio can be obtained between the input shaft 1 and the output shaft 3.

Figure 5:
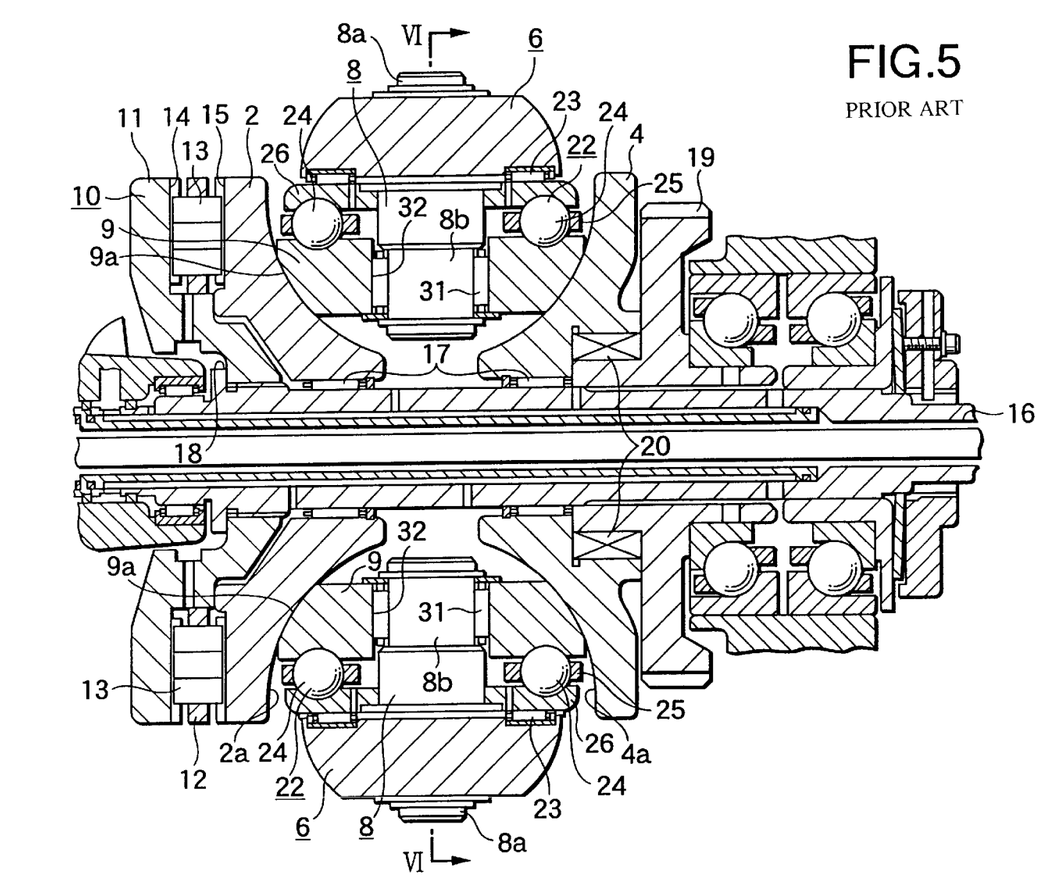
FIG. 5 is a sectional view showing an example of the conventional concrete configuration.
Figure 6:
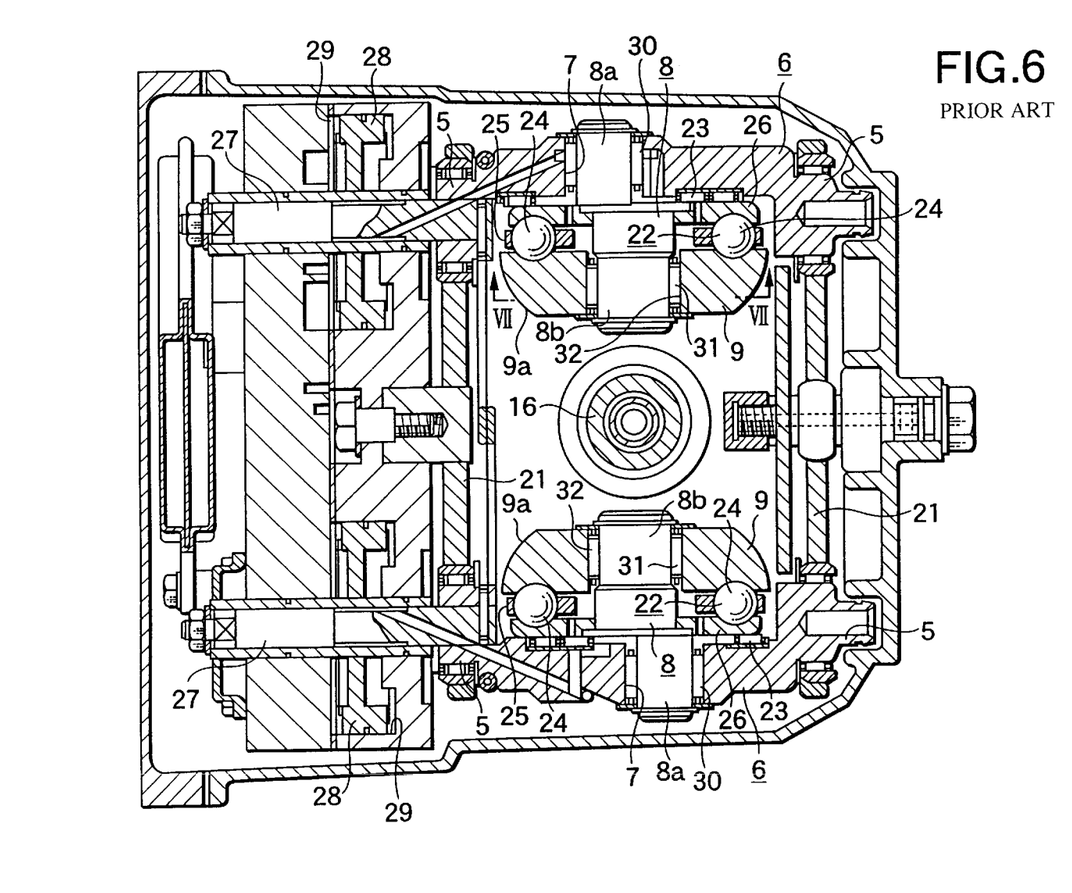
FIG. 6 is a sectional diagram cut along a line VI—VI in FIG. 5.

Further, FIGS. 5 and 6 show a more specific toroidal-type continuously variable transmission disclosed in Japanese Utility Model Laid-Open No. 173552/1989. An input side disk 2 and an output side disk 4 are supported on the periphery of a cylindrical input shaft 16 through needle roller bearings 17, 17 so as to be freely rotatable and freely movable in the axial direction of the input shaft, respectively. A cam plate 11 for constituting a pressure device of a loading cam type 10 is spline engaged with the outer peripheral surface of the end portion (left end portion in FIG. 5) of the input shaft 16 and is prevented by a collar portion 18 from moving in the direction away from the input side disk 2. An output gear 19 is coupled to the output side disk 4 through keys 20, 20 so that the output side disk 4 and the output gear 19 are rotated synchronously.

A pair of trunnions 6, 6 are supported at their both end portions by a pair of yokes 21, 21 so as to be freely swingable and freely movable in the axial direction (the front and rear direction in FIG. 5 and the left and right direction in FIG. 6), respectively. The base half portions 8a of displacement shafts 8 are rotatably supported at circular holes 7 formed at the intermediate portions of the trunnions 6, 6 by means of radial needle roller barings 30, respectively. Further, power rollers 9 are rotatably supported at the peripheries of the tip half portions 8b of the displacement shafts 8 protruding from the inner surfaces of the trunnions 6, 6 by means of radial needle roller bearings 31, respectively. The base half portions 8a and the tip half portions 8b are in parallel and eccentric to each other as described above.

The pair of displacement shafts 8, 8 correspondingly provided for the pair of trunnions 6, 6 are provided at opposite sides by 180 degrees with respect to the input shaft 16. The directions of the tip half portions 8b of the displacement shafts 8, 8 being eccentric with respect to the base half portions 8a is same with respect to the rotation directions of the input side disk 2 and the output side disk 4 (left and right opposite directions in FIG. 6), respectively. Further, the eccentric direction is almost perpendicular to the laying direction of the input shaft 16. Thus, the power rollers 9, 9 are supported so as to be freely mavable to some extent in the laying direction of the input shaft 16. As a result, even when the power rollers 9, 9 are shifted in the axial direction of the input shaft 16 due to the elastic deformation etc. of the respective constituent members based on the thrust load generated by the pressure device 10, such shift can be absorbed without applying an excessive force to the respective constituent members.

Thrust ball bearings 22 and thrust needle roller bearings 23 are provided between the outer surfaces of the power rollers 9, 9 and the inner surfaces of the trunnions 6, 6 in this order from the side of the outer surfaces of the power rollers 9. The thrust ball bearings 22 correspond to thrust rolling bearings of the present invention and serve to allow the rotation of the power rollers 9 while supporting loads in the thrust direction and slight loads (almost 1/10 of the load in the thrust direction) in the radial direction applied to the power rollers 9, respectively. Each of such thrust ball bearings 22 is configured by a plurality of balls 24, 24, an annular retainer 25 for holding these balls 24, 24 so as to roll freely, and an annular outer race 26. The inner raceway of the thrust ball bearings 22 are formed at the outer surfaces of the power rollers 9, and the outer raceway of the thrust ball bearings 22 are formed at the inner surfaces of the outer races 26, respectively. The loads in the radial direction are generated in accordance with the power transmission between the inner surfaces 2a, 4a of the both disks 2, 4 and the peripheral surfaces 9a of the power rollers 9.

The thrust needle roller bearings 23 are sandwiched between the inner surfaces of the trunnions 6, 6 and the outer surfaces of the outer races 26, respectively. Such thrust needle roller bearings 23 allow the power rollers 9 and the outer races 26 to swing around the base half portions 8a of the displacement shafts 8 while bearing thrust loads applied to the outer races 26 from the power rollers 9, respectively.

Further, driving rods 27 are coupled to the one end portions (the left end portions of FIG. 6) of the trunnions 6, 6, and driving pistons 28 are fixed to the outer peripheral surfaces of the intermediate portions of the driving rods 27, respectively. These driving pistons 28 are fitted within the driving cylinders 29 in an oil-tight manner, respectively.

In the above-structured toroidal-type continuously variable transmission, the rotation of the input shaft 16 is transmitted to the input side disk 2 through the pressure device 10. Then, the rotation of the input side disk 2 is transmitted to the output side disk 4 through the pair of power rollers 9, 9, and further the rotation of the output side disk 4 is taken out from the output gear 19.

In the case of changing the rotation speed ratio between the input shaft 16 and the output gear 19, the pair of the driving pistons 28, 28 are shifted in the opposite directions to each other. The pair of the trunnions 6, 6 are shifted in the opposite directions to each other in accordance with the shift of the driving pistons 28, 28 such that the power roller 9 at the lower side in FIG. 6 shifts to the right side in the figure and the power roller 9 at the upper side in the figure shifts to the left side in the figure. As a result, the directions of the forces in the tangential lines, which acts on the abutment portions between the peripheral surfaces 9a, 9a of the power rollers 9, 9 and the inner surfaces 2a, 4a of the input side disk 2 and the output side disk 4, changes, respectively. Then, in accordance with the changes of the directions of the forces, the trunnions 6, 6 swing in the opposite directions to each other around the pivot shafts 5, 5 pivotally supported by the yokes 21, 21, respectively.

As a result, as shown in FIGS. 3 and 4, the abutment positions between the peripheral surfaces 9a, 9a of the power rollers 9, 9 and the inner surfaces 2a, 4a are changed, to thereby change the rotation speed ratio between the input shaft 16 and the output gear 19. When the torque transmitted between the input shaft 16 and the output gear 19 varies and the amounts of elastic deformation of the respective constituent members change, the power rollers 9 and the outer races 26 attached to the power rollers 9 rotate slightly around the base half portions 8a of the displacement shafts 8, respectively. Since the thrust needle roller bearings 23 exist between the outer surfaces of the outer races 26 and the inner surfaces of the trunnions 6, the rotation can be performed smoothly. Thus, as described above, the forces for changing the inclined angles of the displacement shafts 8, 8 can be made small.

Figure 7:
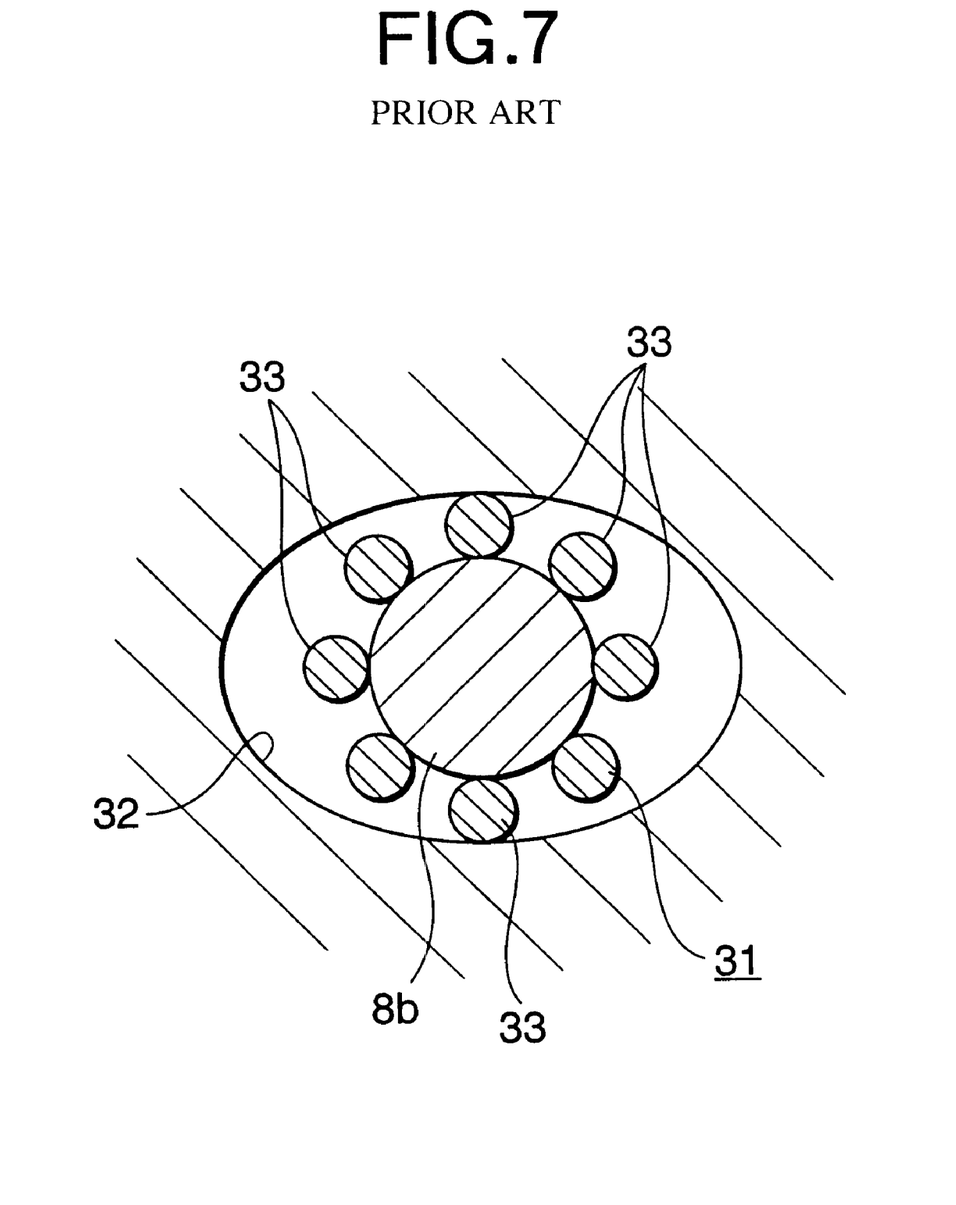
FIG. 7 is a diagram corresponding to a section along a line VII—VII in FIG. 6 and showing in an exaggeration manner an elastically deformed state of the power roller at the time of operation.

When the above-structured toroidal-type continuously variable transmission is in operation, large loads are applied to the power rollers 9, 9 from the inner surfaces 2a, 4a of the input side disk 2 and the output side disk 4 based on the large thrust load generated from the pressure device 10, respectively. These loads have component forces in the thrust direction and component forces in the radial direction based on the abutment states between the both inner surfaces 2a, 4a and the peripheral surfaces 9a, 9a of the power rollers 9, 9, respectively. The component forces of the radial loads act on two positions on the opposite sides in the diameter direction with respect to the power rollers 9, 9 and are applied to the power rollers as forces in a direction for breaking the power rollers 9, 9, respectively. As a result, as exaggeratedly shown in FIG. 7, the sectional configurations of the inner peripheral surfaces of the center holes 32 of the power rollers 9, 9 are elastically deformed in elliptic shapes having minor axes in the axial directions of the input side disk 2 and the output side disk 4 and major axis in the length directions of the trunnions 6, 6 (the front and rear directions of FIG. 5 and the left and right directions of FIG. 6), respectively.

In this manner, when the sectional configurations of the inner peripheral surfaces of the center holes 32 of the power rollers 9, 9 are elastically deformed in elliptic shapes from perfect rounds, there arise the following problems ① and ② at the radial needle roller bearing 31 portions provided between the inner peripheral surfaces of the center holes 32 and the outer peripheral surfaces of the tip half portions 8b of the displacement shafts 8, respectively.

① Only quite a few of the plurality of the needle rollers 33, 33 constituting the radial needle roller bearing 31 bears the radial load. As a result, excessive surface pressures act on the rolling contact portions between the rolling surfaces of the needle rollers 33 and the inner peripheral surface of the center hole 32 and between the rolling surfaces of the needle rollers 33 and the outer peripheral surface of the tip half portion 8b of the displacement shaft 8, so that the rolling surfaces, the inner peripheral surface and the outer peripheral surface may be subjected to damage such as initial peeling, etc.

② At the time of the speed change, since the shift direction of the trunnions 6, 6 coincides with the direction of the major axes of the center holes 32 in the elastically deformed states, there is a time lag until the shifts of the trunnions 6, 6 is transmitted to the power rollers 9 supported by the trunnions 6. In other words, as clear from FIG. 7, since there are gaps between the rolling surfaces of the needle rollers 33 existing in the both the major and minor axis directions and the inner peripheral surfaces of the center holes 32 and the outer peripheral surfaces of the tip half portions 8b of the displacement shafts 8, there is a time lag corresponding to the gaps until the motions of the trunnions 6, 6 is transmitted to the power rollers 9. As a result, the efficiency of the toroidal-type continuously variable transmission is degraded such that the responsibility at the time of the transmission is degraded.

The degradation of the responsibility can be prevented to some extent by improving the fitting accuracy of the needle rollers 33, 33 between the inner peripheral surface of the center hole 32 and the outer peripheral surface of the tip half portion 8b of the displacement shaft 8. However, there is such a problem that the cost becomes expensive since the processing accuracy is required to be high. Further, it is impossible to completely prevent the degradation of the responsibility based on the aforesaid elastic deformation.

SUMMARY OF THE INVENTION

Accordingly, the invention was made in view of the aforesaid circumstances to prevent the elastic deformation of the power rollers which is the cause of the aforesaid various kinds of inconveniences.

According to the present invention, there is provided a toroidal-type continuously variable transmission comprising: first and second disks which are coaxially and rotatably supported in a state that inner surfaces thereof are opposed to each other; a trunnion which swings around a pivot shaft which is disposed at a torsional position with respect to a center shaft of the first and second disks; and a power roller which is sandwiched between the first and second disks in a state being rotatably supported at inner surface of the trunnion. The power roller has a first shaft portion which is protrusively provided at a center portion of an outer surface thereof in a coaxial manner with the power roller, and the power roller is rotatably supported by the first shaft portion.

Further, the above toroidal-type continuously variable transmission may includes a thrust rolling bearing which is provided between the outer surface of the power roller and the inner surface of the trunnion and allows rotation of the power roller while bearing a thrust load applied to the power roller. The thrust rolling bearing has an outer race, and the first shaft portion of the power roller is rotatably supported at a center portion of the outer race.

In addition, a second shaft portion may be provided to protrude at a portion offset from a center of an outer surface of the outer race of the thrust rolling bearing, and the second shaft potion is supported at an intermediate portion of the trunnion so as to be swingable freely.

Moreover, the first shaft portion of the power roller can be supported by a radial bearing.

According to the toroidal-type continuously variable transmission of the invention configured in the aforesaid manner, due to the action similar to that of the conventional toroidal-type continuously variable transmission, the rotation power is transmitted between the first and second disks and the rotation speed ratio between both the disks is adjusted.

In particular, according to the toroidal-type continuously variable transmission of the invention, since the first shaft portion for rotatably supporting the power roller with respect to the trunnion is protrusively provided at the center portion of the outer surface of the power roller, it is not necessary to provide a center hole at the power roller.

Thus, an amount of elastic deformation of the power roller can be suppressed to a small degree despite of the large radial load applied thereto from both the first and second disks. Further, the first shaft portion scarcely deforms elastically by the radial load.

Accordingly, it is possible to prevent the occurrence of such phenomena that the durability of the bearing supporting the power roller is degraded and that the movement of the trunnion is difficult to be transmitted to the power roller and the responsibility of the speed change is degraded.

DETAILED DESCRIPTION OF THE PREFERRED EMBODIMENTS

Figure 1:
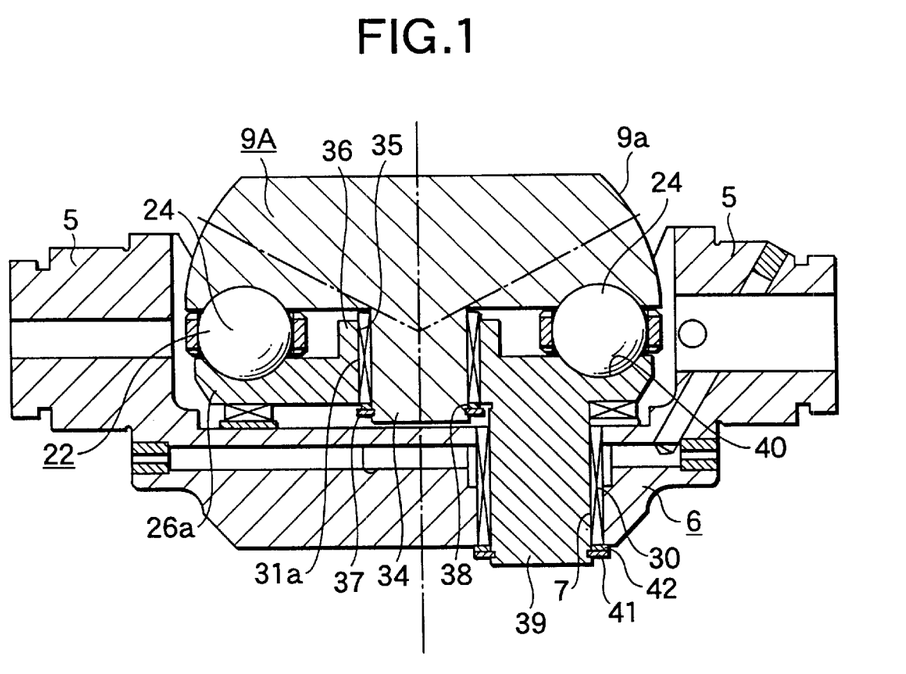
FIG. 1 is a sectional diagram showing a trunnion and a power roller which are taken out and correspond to a trunnion and a power roller disposed at the lower side in FIG. 6 according to an embodiment of the invention.

FIG. 1 shows an example of the embodiment according to the present invention. A feature of the present invention resides in the structure for preventing power rollers from elastically deforming despite of a radial load applied thereto from inner surfaces 2a, 4a of an input side disk 2 and an output side disk 4 (see FIGS. 3 to 5) at the time of operating a toroidal-type continuously variable transmission. The structure and action of other portions of the embodiment is same as those of the conventional toroidal-type continuously variable transmission including the structure shown in FIGS. 5 and 6. Thus, portions identical to those of the conventional toroidal-type continuously variable transmission are referred to by the common symbols, and the explanation thereof is omitted or simplified, and the explanation will be made mainly as to the feature of the present invention.

Figure 2:
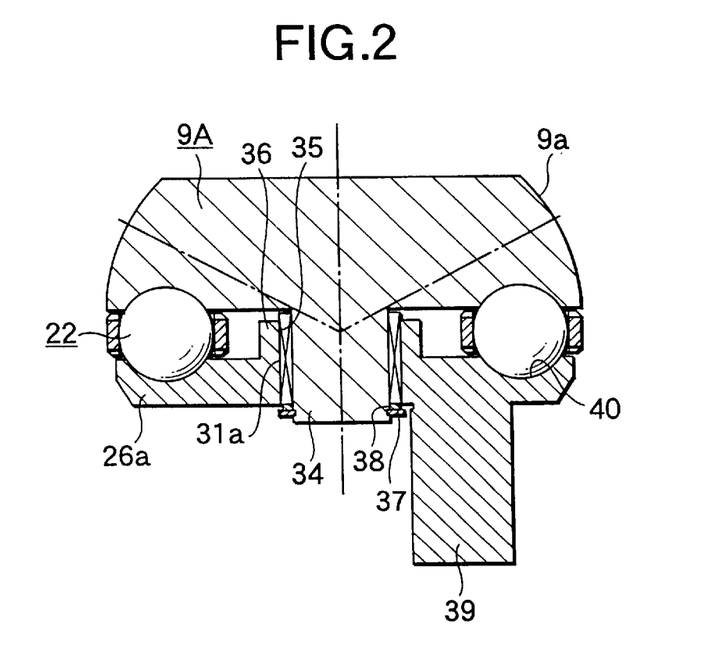
FIG. 2 is a sectional diagram showing the power roller and a thrust ball bearing which are taken out.

A first shaft potion 34 is protrusively provided so as to be coaxial with a power roller 9A at the center portion of the outer surface (which is the end surface on the outside with respect to the radial direction of the input side disk 2 and the output side disk 4 and the lower surface in FIG. 2) of the power roller 9A constituting the toroidal-type continuously variable transmission according to the invention. Although, in the example shown in the figure, the first shaft portion 34 is integrally formed with the power roller 9A, the first shaft portion may be formed in a manner that the base half portion of the shaft rod constituting the shaft portion by the tip half portion thereof is press-fitted into a circular hole formed at the center portion of the power roller and fixed thereto. In any case, the power roller 9A is formed as a solid member having no center hole etc. in a completed state.

The power roller 9A configured in the aforesaid manner is rotatably supported around the first shaft portion 34 on the inner surface of a trunnion 6 through an outer race 26a constituting a thrust ball bearing 22. That is, a cylindrical portion 36 is formed at the inner surface side opening portion of a circular hole 35 formed at the center portion of the outer race 26a, and further radial needle roller bearings 31a are provided between the inner peripheral surface of the circular hole 35 and the cylindrical portion 36 and the outer peripheral surface of the first shaft portion 34, whereby the power roller 9A is supported by the outer race 26a so as to be rotatable around the first shaft portion 34. A stopper ring 37 and a washer 38 are engaged with a portion of the tip end portion of the first shaft portion 34 (the lower end portion in FIGS. 1 and 2) which protrudes from the outer surface (the lower surface in FIGS. 1 and 2) of the outer race 26a. Thus, the power roller 9A does not separate from the outer race 26a even in a state before assembling the power roller 9A and the trunnion 6 into the toroidal-type continuously variable transmission (that is, before abutting the peripheral surface 9a of the power roller 9A against the inner surfaces 2a, 4a of both the disks 2, 4).

A second shaft portion 39 is protrusively provided at a portion away from the center on the outer peripheral surface of the outer race 26a, that is, at the peripheral portion of the circular hole 35. The second shaft portion 39 is integrally formed with the outer race 26a and configured in a manner that the surface of an outer raceway 40 formed on the inner surface (the upper surface in FIG. 1) of the outer race 26a is smooth over the entire periphery and the entire width. Such a second shaft portion 39 is supported so as to be swingable and freely shiftable by radial needle roller bearings 30 at the inside of a circular hole 7 formed at the trunnion 6. A stopper ring 41 and a washer 42 are also engaged with a portion of the tip end portion of the second shaft portion 39 (the lower end portion in FIGS. 1 and 2) which protrudes from the outer surface (the lower surface in FIGS. 1 and 2) of the trunnion 6. Thus, the trunnion 6 does not separate from the outer race 26a even in a state before assembling the power roller 9A and the trunnion 6 into the toroidal-type continuously variable transmission. Accordingly, the respective constituent members being assembled in the state shown in FIG. 1 can be treated integrally even in the state before assembling the toroidal-type continuously variable transmission, so that the parts conveyance, the parts management and the assembling procedures can be facilitated.

In the case of the above-structured toroidal-type continuously variable transmission according to the invention, since the first shaft portion 34 for rotatably supporting the power roller 9A with respect to the trunnion 6 is protrusively provided at the center portion of the outer surface of the power roller 9A, it is not necessary to provide a center hole at the power roller 9A. That is, the power roller 9A is structured not to have any hole originally when the first shaft portion 34 is integrally formed with the power roller 9A. In contrast, even in the case where the shaft portion and the power roller being provided separately are assembled, the assembled power roller does not have any hole portion promoting the elastic deformation based on the radial load.

Thus, an amount of the elastic deformation of the power roller 9A can be suppressed to a small value despite of a large radial load applied thereto from both the disks 2, 4.

Further, the first shaft portion 34 scarcely deforms elastically by the radial load. Thus, it is possible to prevent the occurrence of such phenomena that the durability of the radial needle roller bearing 31a supporting the power roller 9A is degraded and that the axial movement of the trunnion 6 is difficult to be transmitted to the power roller 9A and the responsibility of the speed change is degraded.

That is, even when a large radial load is applied to the power roller 9A from the input side disk 2 and the output side disk 4, the first shaft portion 34 scarcely deforms elastically, and the distance between the outer peripheral surface of the first shaft portion 34 and the circular hole 35 formed at the center portion of the outer race 26a and the distance between the outer peripheral surface of the first shaft portion and the inner peripheral surface of the cylindrical portion 36 are kept to be uniform over the entire circumference thereof. Thus, there will not be caused a large difference in an abutment pressure between the outer and inner peripheral surfaces and the rolling surfaces of the respective needle rollers which constitute the radial needle roller bearing 31 provided between the aforesaid outer and inner peripheral surfaces, so that the rolling fatigue life of these respective surfaces can be secured.

Further, since the gaps between the aforesaid outer and inner peripheral surfaces and the rolling surfaces of the respective needle rollers constituting the radial needle roller bearing 31 does not become larger in the axial direction of the trunnion 6, the movement of the trunnion 6 is transmitted to the power roller 9A almost as it is. Thus, when the trunnion 6 is shifted in the axial direction in order to perform the speed change, this shift is immediately transmitted to the power roller 9A, and so the direction of the force in the tangential line acting between the peripheral surface 9a of the power roller 9A and the inner surfaces 2a, 4a of both the disks 2, 4 changes, whereby the trunnion 6 swings around the pivot shafts 5, 5 provided at the both end portions thereof. Accordingly, the responsibility at the time of the speed change becomes well.

Since the toroidal-type continuously variable transmission according to the invention is configured and operated in the aforesaid manner, it is possible to realize a toroidal-type continuously variable transmission which is stable in its speed change operation, light in its weight and excellent in durability.

While only certain embodiments of the invention have been specifically described herein, it will apparent that numerous modifications may be made thereto without departing from the spirit and scope of the invention.

What is claimed is:

1. A toroidal-type continuously variable transmission comprising:

first and second disks which are coaxially and rotatably supported in a state that inner surface thereof are opposed to each other;

a trunnion including a pivot shaft which is disposed at a torsional position with respect to a center shaft of said first and second disks and is positioned at a side of the center shaft, said trunnion being swingable around said pivot shaft; and a power roller which is sandwiched between said first and second disks in a state being rotatably supported at inner surface of said trunnion, wherein said power roller has a first shaft portion fixed thereto which is protrusively provided at a center portion of an outer surface thereof in a coaxial manner with said power roller, and said power roller is rotatably supported by said first shaft portion.

2. A toroidal-type continuously variable transmission according to claim 1, further comprising:

a thrust rolling bearing which is provided between said outer surface of said power roller and said inner surface of said trunnion and allows rotation of said power roller while bearing a thrust load applied to said power roller, wherein said thrust rolling bearing has an outer race, and said first shaft portion of said power roller is rotatably supported at a center portion of said outer race.

3. A toroidal-type continuously variable transmission according to claim 2, wherein a second shaft portion is protrusively provided at a portion offset from a center of an outer surface of said outer race of said thrust rolling bearing and fixed thereto, and said second shaft portion is rotatably supported at an intermediate portion of said trunnion.

4. A toroidal-type continuously variable transmission according to claim 2, wherein said first shaft portion of said power roller is supported by a radial bearing.

* * * * *